United States Patent
Thielmann et al.

[11] Patent Number: 6,076,384
[45] Date of Patent: Jun. 20, 2000

[54] CLOSURE FOR A SWITCHGEAR CABINET DOOR, MACHINE CASE OR THE LIKE

[75] Inventors: Bodo Thielmann, Herborn-Merkenbau; Frank Küster, Breitscheid-Mendenbach, both of Germany

[73] Assignee: Rittal-Werk Rudolf Loh GmbH & Co. KG, Herborn, Germany

[21] Appl. No.: 09/258,539

[22] Filed: Feb. 26, 1999

[30] Foreign Application Priority Data

Feb. 27, 1998 [DE] Germany .......................... 198 08 271

[51] Int. Cl.⁷ .................................................. E05B 47/06
[52] U.S. Cl. ............................ 70/210; 70/278.7; 70/283; 292/39; 292/144; 292/150
[58] Field of Search .......................... 70/283, 210, 278.7, 70/277, 283.1, 278.1, 278.2, 278.3, 278.6, 280–282; 292/39, 144, 150

[56] References Cited

U.S. PATENT DOCUMENTS

| | | | |
|---|---|---|---|
| 442,198 | 12/1890 | Palmer | 292/144 |
| 1,054,112 | 2/1913 | Handschuh | 292/144 |
| 1,060,317 | 4/1913 | Bywater et al. | 292/144 X |
| 1,804,387 | 5/1931 | Dorsey et al. | 70/282 |
| 1,833,572 | 11/1931 | Hardesty | 70/283 |
| 2,149,695 | 3/1939 | Wilhelm | 292/144 |
| 2,450,052 | 9/1948 | Marple | 292/144 X |
| 2,786,701 | 3/1957 | Porlich | 292/144 |
| 2,910,859 | 11/1959 | Allen et al. | 70/283 |
| 3,627,960 | 12/1971 | Grabek | 292/144 X |
| 4,212,489 | 7/1980 | Snyder | 292/144 X |
| 4,227,732 | 10/1980 | Kish | 292/144 X |
| 4,355,830 | 10/1982 | Rau, III | 292/144 |
| 4,529,234 | 7/1985 | Senften | 292/150 X |
| 5,029,912 | 7/1991 | Gotanda | 292/144 X |
| 5,094,483 | 3/1992 | James | 292/39 |
| 5,224,707 | 7/1993 | Martin | 70/280 X |
| 5,636,536 | 6/1997 | Kinnucan | 292/144 X |
| 5,664,811 | 9/1997 | Martus et al. | 292/144 |

FOREIGN PATENT DOCUMENTS

| | | | |
|---|---|---|---|
| 96400 | 12/1983 | European Pat. Off. | 70/283 |
| 545475 | 7/1922 | France | 292/144 |
| 559461 | 6/1923 | France | 292/144 |
| 723137 | 1/1932 | France | 292/39 |
| 187328 | 6/1907 | Germany | 292/144 |
| 295 07 654 U1 | 10/1996 | Germany . | |
| 127587 | 7/1959 | U.S.S.R. | 292/144 |
| 11310 | 5/1904 | United Kingdom | 292/39 |

*Primary Examiner*—Lloyd A. Gall
*Attorney, Agent, or Firm*—Pauley Peterson Kinne & Fejer

[57] ABSTRACT

A closure for a switchgear cabinet door, machine case or the like, having a safety device. A lock is attached to the switchgear cabinet door, machine case or the like with a first locking element, and a second locking element is attached to the door frame, machine case frame or the like. Both locking elements can be brought into and out of functional connection with each other under the control of an electric signal. Additional locking of the closure can be simply achieved with commercially available locks because the lock has a turnbuckle, which can be rotated by 90°, as the first locking element, and an electromagnet is attached to the door frame or the machine case frame, whereby a locking member as the second locking element can be displaced into and out of the pivot range of the turnbuckle.

17 Claims, 3 Drawing Sheets

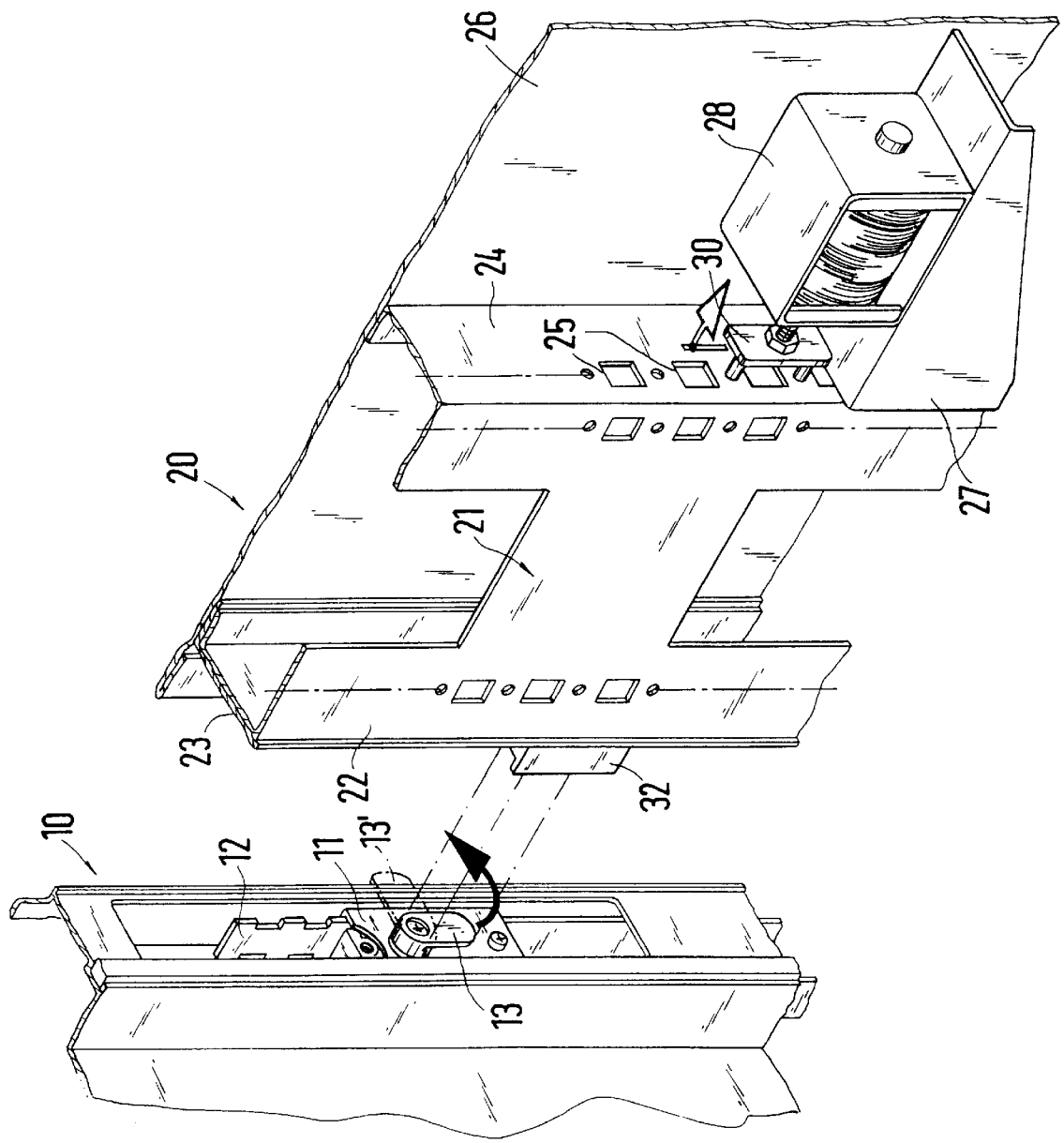

CLOSURE FOR A SWITCHGEAR CABINET DOOR, MACHINE CASE OR THE LIKE

BACKGROUND OF THE INVENTION

1. Field of the Invention

This invention relates to a closure for a switchgear cabinet door, machine case or the like, having a safety device, wherein a lock is attached to the switchgear cabinet door, machine case or the like with a first locking element, and a second locking element is attached to the door frame, machine case frame or the like, and wherein both locking elements can be brought into and out of functional connection with each other under control of an electric signal.

2. Description of Prior Art

A closure of this type is employed for safety reasons at locations where defined prerequisites regarding the release of the opening process of the switchgear cabinet door or machine case must be observed, for example the shut-off of the supply voltage.

Such a method is known from German Patent Publication DE 295 07 654 U1. In this case a pivot lever closure is employed, and locking occurs by the pivot lever, which thus is brought into an initial position in a lock depression. This results in a considerable intervention with the closure, i.e. in a new lock construction.

SUMMARY OF THE INVENTION

It is one object of this invention to create a closure of the type mentioned at the outset, wherein locking is achieved in a considerably simpler way, even with a commercially available lock.

In accordance with this invention, this object is attained with the lock having a turnbuckle, which can be rotated by 90°, as the first locking element, and with an electromagnet attached to the door frame or the machine case frame, by means of which a locking member as the second locking element is displaced into and out of the pivot range of the turnbuckle.

Locks with turnbuckles are commercially available. The turnbuckle on the back of the lock is freely accessible, even when fastened on the switchgear cabinet door or machine case, and its rotating movement can be simply blocked or released by the locking member, which can be displaced from the door frame or machine case frame. The control signal is changed into the respective displacement movements via the electromagnet.

In accordance with one embodiment, the lock is installed in a profiled frame element attached to the inside of the switchgear cabinet door or machine case, and that the turnbuckle is freely accessible through an opening in the profiled frame element.

The locking function can be improved because the lock is designed as a pushrod lock and the turnbuckle is connected, fixed against relative rotation, with the drive element of the pinion, which displaces the pushrods.

The closed position of the switchgear cabinet door or the machine case can be improved because in the locked position of the switchgear cabinet door and of the lock, the turnbuckle, together with a counter-lock element attached to the door frame or the machine case frame, takes on an additional closing function.

In accordance with one embodiment, for the displacement of the blocking member, the electromagnet is fastened on the door frame or the machine case frame and controls a displacement rod with a draw-in plate. The displacement rod is conducted through openings in rows of the hole system of the door frame or the machine case frame. The end of the displacement rod projecting out of the door frame or the machine case frame supports the blocking member. In this case a clear blockage of the turning movement of the blocking member is achieved because the blocking member is designed box-like and in the locking position receives the turnbuckle in a non-rotatable manner.

If the draw-in plate, and thereby the displacement rod with the blocking member, is non-rotatably conducted by guide bolts in openings of the door frame or the machine case frame, then the blocking member is always non-rotatably guided and maintains its position which has been predetermined for locking the turnbuckle.

Control via the electromagnet can take place in two ways. For example, a control is designed such that the displacement rod with the draw-in plate and the blocking member is held in the locking position by a pressure spring, and unlocking can be performed by exciting the electromagnet. However, a control is also possible so that, when the electromagnet is not excited, the blocking member is maintained in the unlocking position, and the blocking member is displaced into the locking position when the electromagnet is excited. This depends on the manner in which locking is desired and the electric control signals derived for this purpose.

This invention will be explained in greater detail by means of an exemplary embodiment represented in the drawings in perspective views.

BRIEF DESCRIPTION OF THE DRAWINGS

FIG. 3 shows an exploded perspective view of the locking mechanism in an unlocked position.

DESCRIPTION OF PREFERRED EMBODIMENTS

Figure 1:
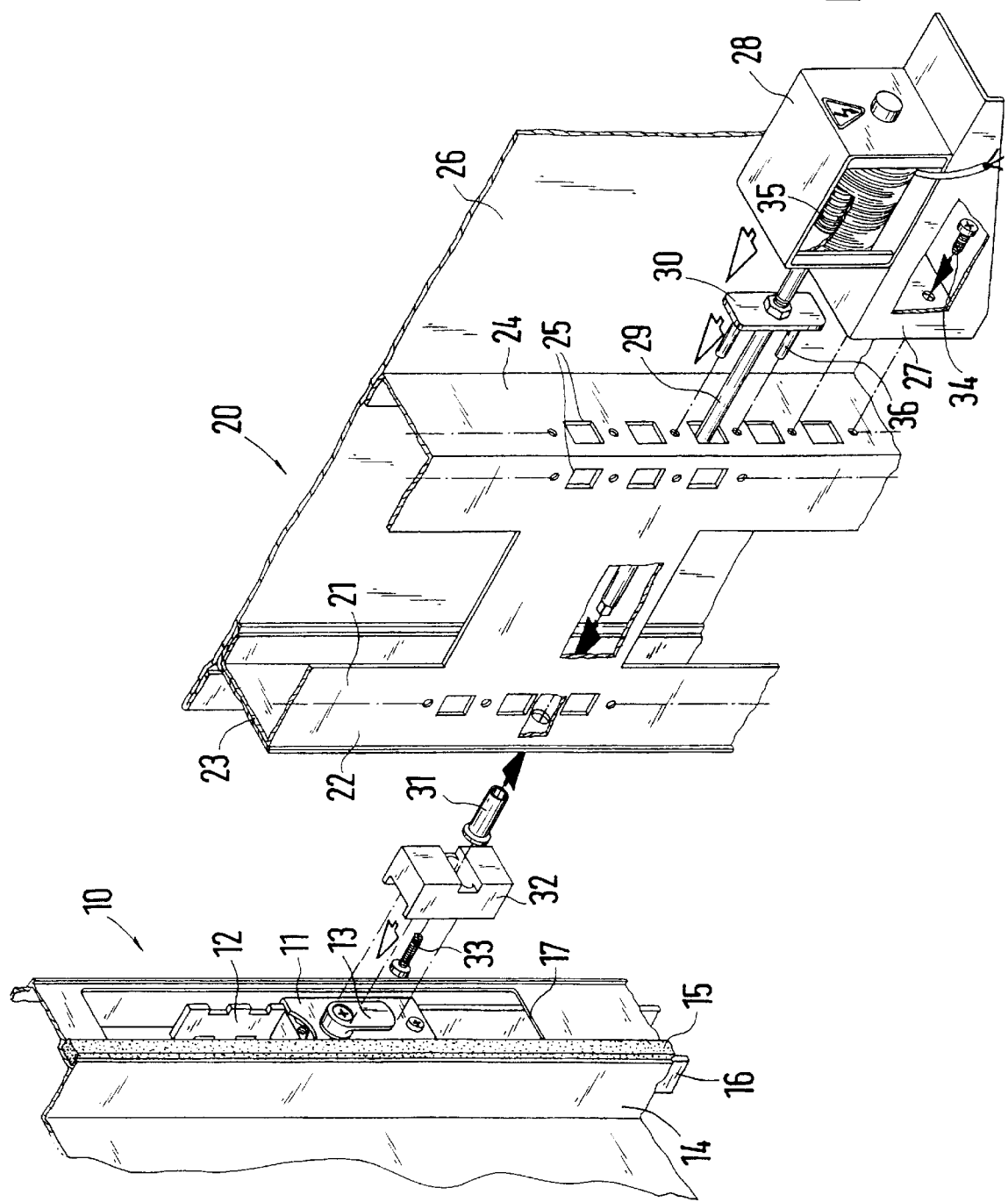
FIG. 1 shows an exploded perspective view of elements required for an additional locking of the closure in an assembly position.

The exemplary embodiment represents the closure and the lock of a switchgear cabinet door. The closing process of the cabinet door 10 is performed separately from the locking and proceeds in a known manner. A profiled frame element 14 is attached as a reinforcement frame to the inside of the switchgear cabinet door 10 or is beveled on the switchgear cabinet door 10. A commercially available pushrod lock 11, which controls the two pushrods 12 and 16 in opposite directions in a known manner, is installed in the profiled frame element 14. In this case the displacement is performed by a pinion, which can be rotated and which is connected, fixed against relative rotation, with a rotatably seated lock actuation element. The lock 11 is accessible through an opening 17 in the profiled frame element 14. The lock actuation element is connected, fixed against relative rotation, with a turnbuckle 13, which is positioned in the area of the opening 17 of the profiled frame element 14, and is freely accessible and can also be used for the locking function.

An electromagnet 28 is fastened on the facing frame leg of the door frame 21 and is seated on a bracket 27, which is bolted to the frame leg by screws 34.

The electromagnet 28 controls a draw-in plate 30, which is connected with a displacement rod 29. The displacement rod 29 is guided through openings 25 in rows of system holes, which are cut both into the sides 23 and 24 of the profiled frame of the door frame 21, as well as into the side 22 of the profiled frame of the door frame 21. A blocking member 32 is fastened to the end of the displacement rod 29 by means of a connecting element 31 and a screw 33, which projects from the side 23 of the profiled frame 21, and which can be inserted into the opening 17 of the profiled frame element 14 in the closed position of the switchgear cabinet door 10. In the closed position, a sealing element 15 attached to the profiled frame element 14 provides sealing of the switchgear cabinet on the profiled frame of the door frame 21, which is connected with the lateral wall 26 of the switchgear cabinet.

Figure 2:
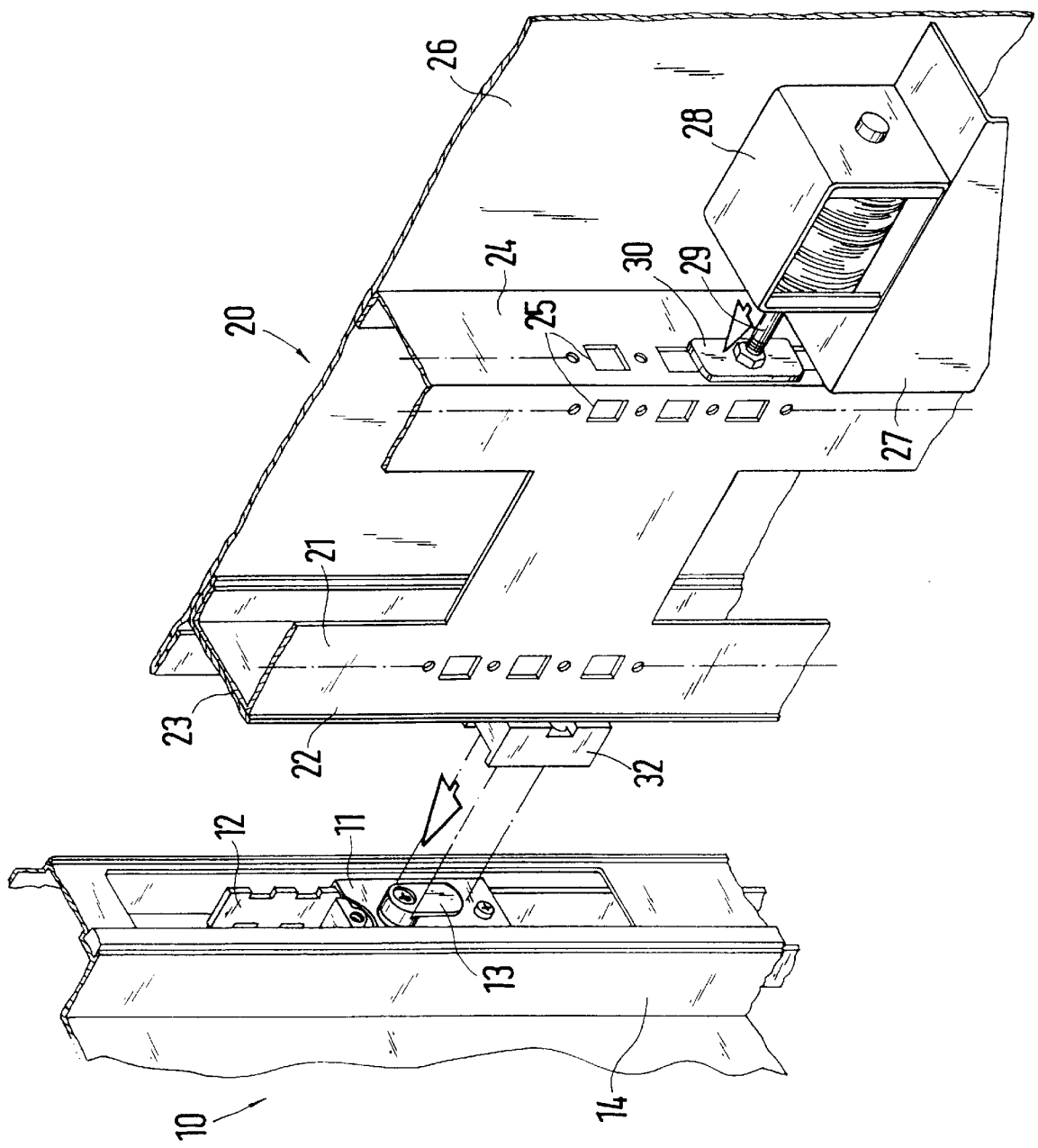
FIG. 2 shows an exploded perspective view of a locking mechanism in a locked position.

In the exemplary embodiment, the displacement rod 29 is maintained by means of a pressure spring in the locked position shown in FIG. 2, in which the blocking member 32 is at a greater distance from the side 23 of the door frame 21.

If in the closed position of the switchgear cabinet door 10 the turnbuckle 13 of the closed lock 11 is in the position shown in FIG. 2, the box-like designed blocking member 32 receives the turnbuckle 13 in a non-rotatable manner. Thus the lock 11 can be brought into the closed position only when the switchgear cabinet door 10 is closed, and it is necessary because of the excitation of the electromagnet to bring the blocking member 32 first into the unlocking position shown in FIG. 3, in which the blocking member 32 is arranged closer to the side 23 of the door frame 21, so that the turnbuckle 13 can still be rotated. When the closing process is terminated, locking can be performed and maintained by turning off the electromagnet 28. When the electromagnet 28 is excited again, the turnbuckle 13 is released by the blocking member 32 and can be turned again when the lock 11 is placed in the opening position, as shown in FIG. 3.

The control of the blocking member 32 can also be designed in such a way that locking is performed when the electromagnet 28 is excited and is canceled when the electromagnet 28 is not excited.

What is claimed is:

1. In a closure with a cabinet frame and a door and having a safety device with a lock attached to the cabinet door with a first locking element, and a second locking element attached to a door frame wherein both of the first and the second locking elements can be brought into and out of functional connection with each other under the control of an electric signal, the improvement comprising:

the lock (11) having a turnbuckle (13) rotatable about 90° as the first locking element, and an electromagnet (28) attached to the door frame (21) and displacing a blocking member (32), as the second locking element, into and out of a pivot range of the turnbuckle (13) for blocking rotation of the turnbuckle, said blocking member including a recess at an axial free end thereof for engaging an outer periphery of the turnbuckle.

2. In the closure in accordance with claim 1, wherein the lock (11) is installed in a profiled frame element (14) attached to an inside surface of the cabinet door (10) and the turnbuckle (13) is freely accessible through an opening (17) in the profiled frame element (14).

3. In the closure in accordance with claim 2, wherein the lock (11) is designed as a pushrod lock and the turnbuckle (13) is connected, fixed against relative rotation, with a drive element of a pinion which displaces a plurality of pushrods (12, 16).

4. In the closure in accordance with claim 3, wherein the electromagnet (28) is fastened on the door frame (21) and a draw-in plate (30) controls a displacement rod (29), the displacement rod (29) is conducted through rows of openings (25) of the door frame (21), and an end of the displacement rod (29) projecting out of the door frame (21) supports the blocking member (32).

5. In the closure in accordance with claim 4, wherein the blocking member (32) is designed in a box-like shape and in the locking position receives the turnbuckle (13) in a non-rotatable manner.

6. In the closure in accordance with claim 5, wherein the draw-in plate (30) and the displacement rod (29) with the blocking member (32) is non-rotatably conducted by guide bolts (36) in the openings (25) of the door frame (21).

7. In the closure in accordance with claim 6, wherein the displacement rod (29) with the draw-in plate (30) and the blocking member (32) is held in the locking position by a pressure spring (35), and can be moved out of the locking position by exciting the electromagnet (28).

8. In the closure in accordance with claim 6, wherein with the electromagnet (28) not excited the blocking member (32) is maintained in the unlocking position, and the blocking member (32) is displaced into the locking position when the electromagnet (28) is excited.

9. In the closure in accordance with claim 1, wherein the lock (11) is designed as a pushrod lock and the turnbuckle (13) is connected, fixed against relative rotation, with a drive element of a pinion which displaces a plurality of pushrods (12, 16).

10. In the closure in accordance with claim 1, wherein the electromagnet (28) is fastened on the door frame (21) and a draw-in plate (30) controls a displacement rod (29), the displacement rod (29) is conducted through rows of openings (25) of the door frame (21), and an end of the displacement rod (29) projecting out of the door frame (21) supports the blocking member (32).

11. In the closure in accordance with claim 1, wherein the blocking member (32) is designed in a box-like shape and in a locking position receives the turnbuckle (13) in a non-rotatable manner.

12. In the closure in accordance with claim 4, wherein the draw-in plate (30) and the displacement rod (29) with the blocking member (32) is non-rotatably conducted by guide bolts (36) in the openings (25) of the door frame (21).

13. In the closure in accordance with claim 1, wherein a displacement rod (29) with a draw-in plate (30) and the blocking member (32) is held in a locking position by a pressure spring (35), and can be moved out of the locking position by exciting the electromagnet (28).

14. In the closure in accordance with claim 1, wherein with the electromagnet (28) not excited the blocking member (32) is maintained in an unlocking position, and the blocking member (32) is displaced into a locking position when the electromagnet (28) is excited.

15. In a closure with a cabinet frame and a door and having a safety device with a lock attached to the cabinet door with a first locking element, and a second locking element attached to a door frame wherein both of the first and the second locking elements can be brought into and out of functional connection with each other under the control of an electric signal, the improvement comprising:

the lock (11) having a turnbuckle (13) rotatable about 90° as the first locking element, and an electromagnet (28) attached to the door frame (21) and displacing a blocking member (32), as the second locking element, into and out of a pivot range of the turnbuckle (13) for blocking rotation of the turnbuckle;

wherein the lock (11) is installed in a profiled frame element (14) attached to an inside surface of the cabinet door (10) and the turnbuckle (13) is freely accessible through an opening (17) in the profiled frame element (14); and wherein the lock (11) is designed as a pushrod lock and the turnbuckle (13) is connected, fixed against relative rotation, with a drive element of a pinion which displaces a plurality of pushrods (12, 16).

16. In a closure with a cabinet frame and a door and having a safety device with a lock attached to the cabinet door with a first locking element, and a second locking element attached to a door frame wherein both of the first and the second locking elements can be brought into and out of functional connection with each other under the control of an electric signal, the improvement comprising:

the lock (11) having a turnbuckle (13) rotatable about 90° as the first locking element, and an electromagnet (28) attached to the door frame (21) and displacing a blocking member (32), as the second locking element, into and out of a pivot range of the turnbuckle (13) for blocking rotation of the turnbuckle; and wherein the lock (11) is designed as a pushrod lock and the turnbuckle (13) is connected, fixed against relative rotation, with a drive element of a pinion which displaces a plurality of pushrods (12, 16).

17. In a closure with a cabinet frame and a door and having a safety device with a lock attached to the cabinet door with a first locking element, and a second locking element attached to a door frame wherein both of the first and the second locking elements can be brought into and out of functional connection with each other under the control of an electric signal, the improvement comprising;

the lock (11) having a turnbuckle (13) rotatable about 90° as the first locking element, and an electromagnet (28) attached to the door frame (21) and displacing a blocking member (32), as the second locking element, into and out of a pivot range of the turnbuckle (13) for blocking rotation of the turnbuckle; and wherein the blocking member (32) is designed in a box-like shape and in a locking position receives the turnbuckle (13) in a non-rotatable manner.

* * * * *